US010966001B2

(12) United States Patent
Shen

(10) Patent No.: US 10,966,001 B2
(45) Date of Patent: Mar. 30, 2021

(54) REMOTE CLOUD-BASED VIDEO PRODUCTION SYSTEM IN AN ENVIRONMENT WHERE THERE IS NETWORK DELAY

(71) Applicant: TVU Networks Corporation, Mountain View, CA (US)

(72) Inventor: Paul Shen, Woodside, CA (US)

(73) Assignee: TVU Networks Corporation, Mountain View, CA (US)

(*) Notice: Subject to any disclaimer, the term of this patent is extended or adjusted under 35 U.S.C. 154(b) by 43 days.

(21) Appl. No.: 16/369,957

(22) Filed: Mar. 29, 2019

(65) Prior Publication Data

US 2019/0313163 A1    Oct. 10, 2019

Related U.S. Application Data

(60) Provisional application No. 62/652,978, filed on Apr. 5, 2018.

(51) Int. Cl.
*H04N 5/445* (2011.01)
*H04N 21/8547* (2011.01)
(Continued)

(52) U.S. Cl.
CPC ......... *H04N 21/8547* (2013.01); *H04N 5/222* (2013.01); *H04N 21/2187* (2013.01);
(Continued)

(58) Field of Classification Search
CPC ......... H04N 21/8547; H04N 21/41407; H04N 21/64322; H04N 21/23406; H04N 21/242;
(Continued)

(56) References Cited

U.S. PATENT DOCUMENTS 5,510,848 A * 4/1996 Nocture ............... H04N 5/4401
                                                     348/556
5,991,799 A * 11/1999 Yen ..................... G06F 16/9535
                                                     709/218
(Continued)

FOREIGN PATENT DOCUMENTS

WO    2015148634    10/2015
WO    2016202889    12/2016

*Primary Examiner* — Michael B. Pierorazio
(74) *Attorney, Agent, or Firm* — Lipsitz & McAllister, LLC

(57) ABSTRACT

A cloud-based video production system, methods, and apparatus are provided. Video sources are in communication with a cloud-based video production server and a remote user interface via a network. A control unit, which is located at or in communication with video production server, is in communication with the remote user interface. A buffer, corresponding to each of the video sources, is disposed between each of the video sources and the control unit to account for network delays. Commands for selecting and manipulating video content from the video sources are sent from the user interface to the control unit, each of the commands containing a command timestamp corresponding to the video timestamp of the video frame displayed on the user interface when the command is issued. The control unit executes each command at a time when the video timestamp at an output of the corresponding buffer corresponds to the command timestamp. The control unit outputs a video program in accordance with the commands.

22 Claims, 1 Drawing Sheet

(51) Int. Cl.

| | |
|---|---|
| *H04N 21/218* | (2011.01) |
| *H04N 21/2187* | (2011.01) |
| *H04N 21/2665* | (2011.01) |
| *H04N 21/472* | (2011.01) |
| *H04N 21/6587* | (2011.01) |
| *H04N 21/414* | (2011.01) |
| *H04N 21/643* | (2011.01) |
| *H04N 5/222* | (2006.01) |
| *H04N 21/234* | (2011.01) |
| *H04N 21/242* | (2011.01) |

(52) U.S. Cl.
CPC . *H04N 21/21805* (2013.01); *H04N 21/23406* (2013.01); *H04N 21/242* (2013.01); *H04N 21/2665* (2013.01); *H04N 21/41407* (2013.01); *H04N 21/47205* (2013.01); *H04N 21/64322* (2013.01); *H04N 21/6587* (2013.01)

(58) Field of Classification Search
CPC ......... H04N 21/21805; H04N 21/2187; H04N 21/2665; H04N 21/47205; H04N 21/6587; H04N 21/658
USPC .......................................................... 725/59
See application file for complete search history.

(56) References Cited

U.S. PATENT DOCUMENTS

| | | | | |
|---|---|---|---|---|
| 6,208,691 | B1* | 3/2001 | Balakrishnan | H04N 21/23406 348/700 |
| 7,299,275 | B2* | 11/2007 | Tsukidate | H04N 7/17354 348/E7.075 |
| 7,369,749 | B2* | 5/2008 | Ichioka | H04N 5/44543 386/291 |
| 7,603,683 | B2* | 10/2009 | Reto | H04L 29/06027 709/204 |
| 7,653,921 | B2* | 1/2010 | Herley | H04N 21/4756 725/19 |
| 7,712,125 | B2* | 5/2010 | Herigstad | H04N 7/163 725/141 |
| 7,734,579 | B2* | 6/2010 | White | H04N 21/8455 707/609 |
| 7,817,186 | B2 | 10/2010 | Tamamura | |
| RE41,968 | E* | 11/2010 | Washino | G11B 27/002 348/722 |
| 7,908,625 | B2* | 3/2011 | Robertson | H04L 12/2838 725/82 |
| 8,151,301 | B2* | 4/2012 | Bennett | H04N 21/234363 725/41 |
| 8,184,168 | B2 | 5/2012 | Kindborg et al. | |
| 8,307,395 | B2* | 11/2012 | Issa | H04N 21/435 725/46 |
| 8,490,133 | B1* | 7/2013 | Parekh | H04N 21/2353 725/44 |
| 8,516,345 | B2* | 8/2013 | Quere | H04N 19/188 714/776 |
| 8,621,508 | B2* | 12/2013 | Rowe | H04N 21/488 725/37 |
| 8,631,452 | B2* | 1/2014 | Xu | H04N 21/4384 725/109 |
| 8,713,195 | B2* | 4/2014 | Pickens | H04N 21/6125 709/232 |
| 8,806,563 | B2* | 8/2014 | Coufal | H04N 21/6106 725/143 |
| 8,839,295 | B2* | 9/2014 | Kim | H04N 21/4821 725/40 |
| 8,881,220 | B2* | 11/2014 | Arya | H04N 21/2401 725/118 |
| 9,226,022 | B2* | 12/2015 | Ferguson | H04N 7/17318 |
| 10,021,433 | B1* | 7/2018 | Hundemer | H04L 65/607 |
| 10,270,959 | B1 | 4/2019 | Bart et al. | |
| 2002/0054244 | A1* | 5/2002 | Holtz | H04N 21/4782 348/722 |
| 2002/0057348 | A1 | 5/2002 | Miura et al. | |
| 2003/0061206 | A1* | 3/2003 | Qian | G06F 16/9535 |
| 2003/0063213 | A1 | 4/2003 | Poplin | |
| 2003/0063217 | A1* | 4/2003 | Smith | H04L 69/329 348/460 |
| 2004/0103426 | A1* | 5/2004 | Ludvig | H04N 21/44222 725/9 |
| 2004/0148571 | A1* | 7/2004 | Lue | G06F 16/9577 715/239 |
| 2004/0215718 | A1* | 10/2004 | Kazmi | H04L 69/329 709/203 |
| 2005/0144455 | A1* | 6/2005 | Haitsma | G06F 16/683 713/176 |
| 2005/0262542 | A1* | 11/2005 | DeWeese | H04N 21/454 725/106 |
| 2006/0031883 | A1* | 2/2006 | Ellis | H04N 21/43615 725/58 |
| 2006/0031889 | A1* | 2/2006 | Bennett | H04N 19/40 725/80 |
| 2006/0055785 | A1 | 3/2006 | Nagajima | |
| 2006/0190966 | A1* | 8/2006 | McKissick | H04N 21/2543 725/61 |
| 2007/0124756 | A1* | 5/2007 | Covell | H04N 5/445 725/18 |
| 2007/0157281 | A1* | 7/2007 | Ellis | H04N 7/17309 725/134 |
| 2007/0204285 | A1* | 8/2007 | Louw | H04N 21/47815 725/14 |
| 2008/0027953 | A1* | 1/2008 | Morita | G06F 16/211 |
| 2008/0059532 | A1* | 3/2008 | Kazmi | H04L 65/4069 |
| 2008/0060036 | A1* | 3/2008 | Cox | H04N 21/23418 725/110 |
| 2008/0077568 | A1* | 3/2008 | Ott | G06F 16/951 |
| 2008/0170630 | A1* | 7/2008 | Falik | H04L 47/26 375/240.29 |
| 2008/0215170 | A1* | 9/2008 | Milbrandt | G06F 16/68 700/94 |
| 2008/0235733 | A1* | 9/2008 | Heie | H04N 7/17318 725/46 |
| 2009/0037954 | A1* | 2/2009 | Nagano | H04N 21/47214 725/39 |
| 2009/0119708 | A1* | 5/2009 | Harrar | H04N 21/482 725/39 |
| 2009/0179982 | A1 | 7/2009 | Yanagisawa et al. | |
| 2009/0183201 | A1* | 7/2009 | Dasgupta | G09B 5/065 725/40 |
| 2009/0237548 | A1 | 9/2009 | Watanabe et al. | |
| 2009/0320058 | A1* | 12/2009 | Wehmeyer | H04N 21/2143 725/31 |
| 2009/0320060 | A1* | 12/2009 | Barrett | H04N 21/812 725/32 |
| 2009/0320072 | A1* | 12/2009 | McClanahan | H04N 21/458 725/47 |
| 2009/0320073 | A1* | 12/2009 | Reisman | G06F 16/954 725/51 |
| 2009/0328085 | A1* | 12/2009 | Beyabani | G06Q 30/02 725/9 |
| 2010/0050203 | A1* | 2/2010 | Yamagishi | H04N 21/44008 725/22 |
| 2010/0121936 | A1* | 5/2010 | Liu | H04N 5/44543 709/217 |
| 2010/0131385 | A1* | 5/2010 | Harrang | G06Q 30/0277 705/26.1 |
| 2010/0251292 | A1* | 9/2010 | Srinivasan | H04N 21/440218 725/37 |
| 2010/0296487 | A1* | 11/2010 | Karaoguz | H04W 84/045 370/332 |
| 2010/0333148 | A1* | 12/2010 | Musha | H04N 21/2401 725/81 |
| 2011/0066744 | A1* | 3/2011 | Del Sordo | H04N 21/235 709/231 |
| 2011/0068899 | A1* | 3/2011 | Ioffe | G05B 15/02 340/8.1 |

(56) References Cited

U.S. PATENT DOCUMENTS

| | | | |
|---|---|---|---|
| 2011/0086619 A1* | 4/2011 | George | H04M 1/72533 455/414.1 |
| 2011/0138064 A1* | 6/2011 | Rieger | H04N 21/433 709/228 |
| 2011/0179462 A1* | 7/2011 | Kubo | H04L 43/0811 725/110 |
| 2011/0191439 A1* | 8/2011 | Dazzi | G06F 15/16 709/217 |
| 2011/0191446 A1* | 8/2011 | Dazzi | G06F 15/16 709/219 |
| 2012/0110614 A1* | 5/2012 | Whitley | H04N 21/4131 725/32 |
| 2012/0117590 A1* | 5/2012 | Agnihotri | H04N 21/25875 725/30 |
| 2012/0144435 A1* | 6/2012 | Spilo | H04N 21/43615 725/78 |
| 2012/0278725 A1* | 11/2012 | Gordon | H04N 21/25891 715/738 |
| 2012/0291079 A1* | 11/2012 | Gordon | H04N 21/47205 725/109 |
| 2012/0307052 A1 | 12/2012 | Thiruvengada et al. | |
| 2012/0307082 A1 | 12/2012 | Thiruvengada et al. | |
| 2013/0128074 A1 | 5/2013 | Mitsugi | |
| 2013/0155182 A1 | 6/2013 | Bekiares et al. | |
| 2013/0268962 A1* | 10/2013 | Snider | H04N 21/4307 725/32 |
| 2013/0268973 A1* | 10/2013 | Archibong | H04N 21/4828 725/51 |
| 2014/0067828 A1* | 3/2014 | Archibong | G06F 3/0481 707/748 |
| 2014/0092254 A1 | 4/2014 | Mughal et al. | |
| 2014/0125703 A1* | 5/2014 | Roveta | G11B 27/322 345/633 |
| 2014/0280564 A1* | 9/2014 | Darling | H04L 51/32 709/204 |
| 2015/0022674 A1 | 1/2015 | Blair et al. | |
| 2015/0039608 A1* | 2/2015 | Basilico | G06F 16/735 707/734 |
| 2015/0082203 A1 | 3/2015 | James et al. | |
| 2015/0100586 A1* | 4/2015 | Caruso | G06F 16/11 707/747 |
| 2015/0113576 A1 | 4/2015 | Carroll | |
| 2015/0128179 A1* | 5/2015 | Cormican | H04N 21/47217 725/38 |
| 2015/0286716 A1* | 10/2015 | Snibbe | G06F 16/178 707/610 |
| 2015/0304689 A1 | 10/2015 | Warren | |
| 2015/0378000 A1 | 12/2015 | Bar David et al. | |
| 2016/0057477 A1* | 2/2016 | Finkelstein | H04N 21/4516 725/31 |
| 2016/0112741 A1 | 4/2016 | Elm et al. | |
| 2016/0366228 A1 | 12/2016 | Overton et al. | |
| 2016/0381276 A1 | 12/2016 | Li et al. | |
| 2017/0070659 A1 | 3/2017 | Kievsky et al. | |
| 2017/0127150 A1 | 5/2017 | Kuo et al. | |
| 2017/0295309 A1 | 10/2017 | Cabral et al. | |
| 2017/0303005 A1 | 10/2017 | Shen et al. | |
| 2018/0088444 A1 | 3/2018 | Matsumoto et al. | |
| 2020/0013432 A1 | 1/2020 | Doi et al. | |

* cited by examiner

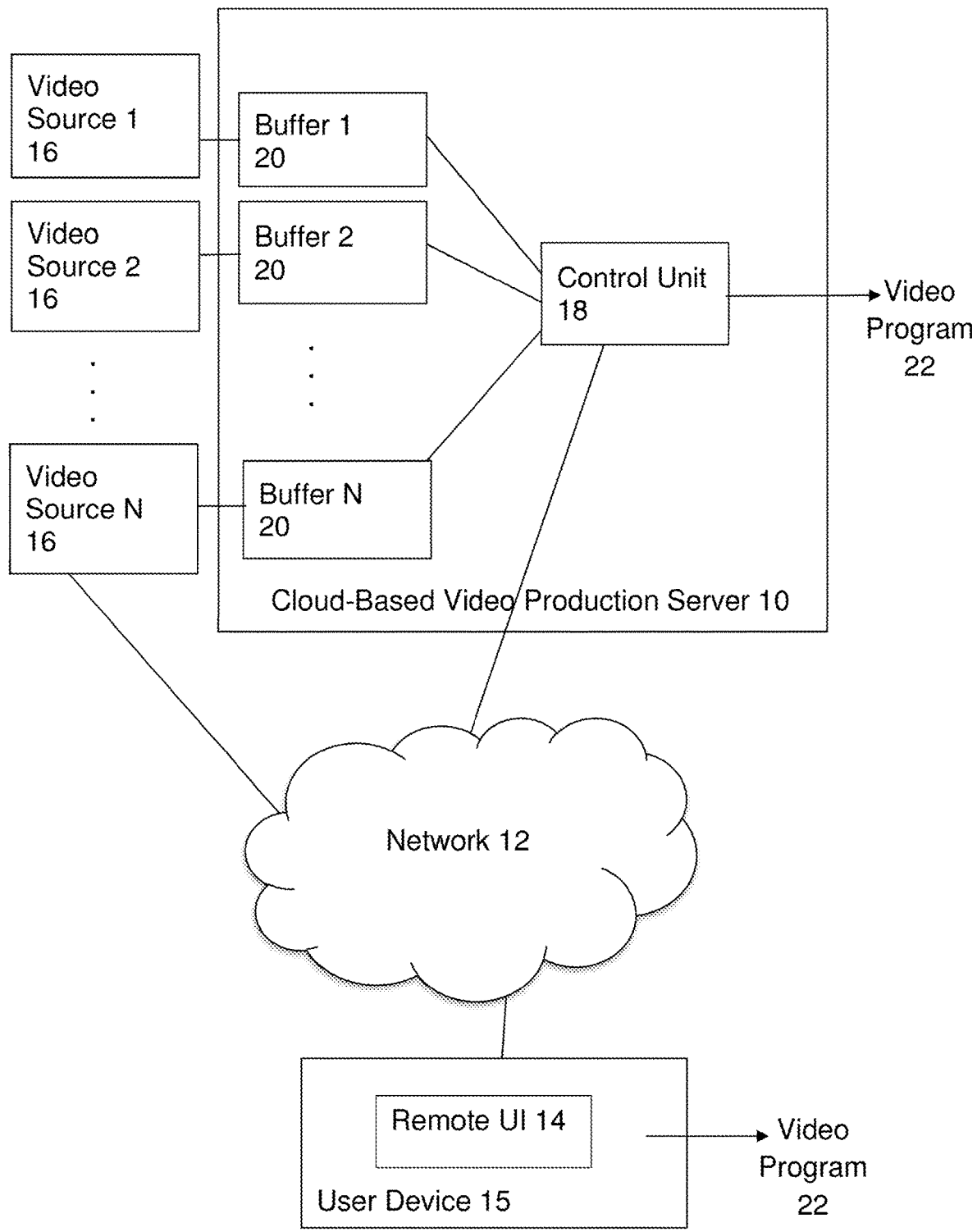

REMOTE CLOUD-BASED VIDEO PRODUCTION SYSTEM IN AN ENVIRONMENT WHERE THERE IS NETWORK DELAY

This application claims the benefit of U.S. Provisional Application No. 62/652,978 filed on Apr. 5, 2018, which is incorporated herein and made a part hereof by reference for all purposes.

BACKGROUND OF THE INVENTION

The present invention relates to the field of video production. More specifically, the present invention relates to a cloud-based video production system.

Live video production, for example for news or sports broadcasts, requires a physical production switch along with production staff on site, and is a costly process. It would be advantageous to be able to carry out the entire production process on a cloud-based video production system without requiring the physical presence of production staffs on site.

The methods and apparatus of the present invention provide the foregoing and other advantages.

SUMMARY OF THE INVENTION

The present invention relates to a cloud-based video production system.

In an example embodiment of a cloud-based video production system in accordance with the present invention, a cloud-based video production server is provided. A remote user interface running on a user device is also provided. One or more video sources are in communication with the cloud-based video production server and the remote user interface via a network. A control unit, located at or in communication with the cloud-based video production server, is in communication with the remote user interface via the network. A buffer, corresponding to each of the one or more video sources, is disposed between each of the one or more video sources and the control unit to account for network delays. Each frame of video content is provided with a video timestamp. Commands for selecting and manipulating video content from the one or more video sources are sent from the user interface to the control unit, each of the commands containing a command timestamp corresponding to the video timestamp of the video frame displayed on the user interface when the command is issued. The control unit executes each command at a time when the video timestamp at an output of the corresponding buffer corresponds to the command timestamp. The control unit outputs a video program in accordance with the commands.

The user interface may comprise one of an application or a web browser running on an Internet-enabled user device. The user device may comprise one of a computer, a laptop computer, a portable computer, a tablet computer, a smart phone, a smart watch, a personal computing device, an Internet-enabled device, or the like.

The content from the one or more video sources is viewable on the user interface.

The commands may comprise commands for selecting from among the video content or portions of the video content provided by the one or more video sources, commands for combining the video content or portions of the video content, commands for switching between the one or more video sources, commands for manipulating the video content or portions of the video content, commands for providing a graphics overlay, commands for turning on or off the graphics overlay, commands for adjusting an audio level for the video content or the portions of the video content, and the like.

Each of the one or more video sources comprises one of a video camera, a camcorder, a television camera, a movie camera, a portable electronic device, a tablet computer, a smart phone, an IP or web camera, or the like.

The video program is output for at least one of live broadcast, distribution to one or more social media platforms, and distribution to a digital media distribution platform. The video program may also be downloaded to the user device, and the downloaded video program may be one of distributed to media outlets or social media platforms in an original downloaded form, or modified at the user device prior to such distribution.

The video program may comprise one of a news program, a sports program, a weather program, a live event program, an entertainment program, or the like.

The corresponding buffer delays the video content to account for network delay in carrying out the commands.

The instructions for the commands may be sent via an API. The instructions may be scriptable.

The present invention also encompasses a method for cloud-based video production. The method may comprise providing a cloud-based video production server, providing a remote user interface running on a user device, providing video content from one or more video sources to the cloud-based video production server and the remote user interface via a network, providing a control unit located at or in communication with the cloud-based video production server which is also in communication with the remote user interface via the network, and buffering the video content via a corresponding buffer for each of the one or more video sources. The corresponding buffer may be disposed between each of the one or more video sources and the control unit to account for network delays. The method may further comprise providing each frame of video content with a video timestamp, sending commands from the user interface to the control unit for selecting and manipulating video content from the one or more video sources, each of the commands containing a command timestamp corresponding to the video timestamp of the video frame displayed on the user interface when the command is issued, executing each command at the control unit at a time when the video timestamp at an output of the corresponding buffer corresponds to the command timestamp, and outputting a video program in accordance with the commands.

The method embodiments of the present invention may also include various features and functionality of the apparatus and system embodiments discussed above.

BRIEF DESCRIPTION OF THE DRAWINGS

The present invention will hereinafter be described in conjunction with the appended drawing FIGURE:

FIG. 1 shows a block diagram of an example embodiment of a cloud-based video production system in accordance with the present invention.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to a cloud-based video production system. To reduce live video production costs, it is desirable to have a cloud-based video production system.

FIG. 1 is a block diagram illustrating an example embodiment of a cloud-based video production system in accordance with the present invention. In this embodiment, the video production is performed on a cloud-based video production server 10 (located in the cloud). A user is operating the system remotely through a network 12 via a user interface 14. The user interface 14 may be an application or a web browser running on an Internet enabled user device 15 (e.g., a computer, a laptop, a portable computer, a tablet computer, a smart phone, a smart watch, or any other type of personal computing device or other internet or network enabled device). The cloud-based video production server 10, as well as the user interface, may receive raw video content from one or more video sources 16. The user interface 14 may include a display for displaying the video content from the one or more video sources 16 (e.g., via the network 12). The user interface 14 enables a user to select and control which content to use in the video program. Selection of the video content, and execution of commands from the user interface 14, is carried out via a control unit 18 located at or in communication with the cloud-based video production server 10.

The commands may comprise commands for switching between the video sources 16, selecting the video content (or portions of the video content) from one or more of the video sources 16, combining the video content (or portions of the video content) from one or more of the video sources 16, manipulating the video content or portions of the video content, turning on and off a graphics overlay, adjusting an audio level, and the like.

The raw video content (the input video provided by the video sources 16) comprises the unprocessed materials for use by the video production server 10 in producing the finished video program 22. These raw materials may be recorded for later use as well by the buffers 20 or associated storage, as discussed below. Each frame of the raw video content, as well as each frame of the final video program 22, is provided with a time stamp or time code. The time stamps/time codes of the raw video content may be different than those of the video program 22.

In one example embodiment, instructions for the command may be sent via an application program interface (API), and all instructions may be scriptable. It should be appreciated that the video production process can be driven by a user interface, by scripts, or by an AI engine which generates the commands. In addition, all the instructions and/or commands provided to the system during the video production process may be recorded with corresponding time stamp(s)/time code(s) in the original video content used for the production and be stored along with the original video content. The resulting video program 22 can then be reproduced using the raw video content and the recorded/stored command scripts or instructions.

The video sources 16 may comprise one or more of a video camera, a camcorder, a television camera, a movie camera, a portable electronic device, a tablet computer, a smart phone, an IP or web camera, or the like.

One challenge in making such a cloud-based system work efficiently is the presence of network delay. When there is a network delay, the actual execution of any commands on the cloud-based production system occurs sometime after the time the actual video frame appears on a display of the user device 15.

To solve any problems associated with network delay, a buffer 20 is added between each video source 16 and the control unit 18. Each video frame of the video content from all the video sources 16 is provided with a timestamp. When a user enters a command into the user interface 14, the command will be sent to the cloud-based video production server 10 with a command timestamp corresponding to the video timestamp of the video frame displayed on the user interface 14 when the command is issued. The control unit 18 in the cloud-based video production server 10 will execute the command at a time when the video timestamp at an output of the video buffer 20 matches or passes the command timestamp.

Since the video content from the video sources 16 is delayed by the corresponding buffer 20, any network delay in carrying out the command from the user interface 14 is accounted for. Using the time stamps from the video content and corresponding timestamps from the commands, the desired actions specified in the commands can be synchronized to affect the desired video content at the appropriate time.

The completed video program 22 may be output from the cloud-based video production server 10 for live broadcast or distribution to other media platforms, such as one or more social media outlets, a digital media distribution platform, or the like. The completed video program 22 may also be downloaded to the user device 15 and distributed to media outlets or further modified or edited prior to such distribution.

The system may be used to create various types of video programs, including news programs, sports, weather, live events, entertainment, and more. The video sources 16 may provide live video content for the production of live video programs. The video content can also be stored for later use. For example, the system may be used to produce a live sporting event, where each video source comprises a different camera or camera angle of the sporting event. Instant replays can be generated by sending commands to the control unit 18 requesting the addition of content from one or more of the video sources which includes the play to be shown in the instant replay. Each buffer 20 may be large enough to record all input feeds from the corresponding video source 16 for the entire event, facilitating instant replay and rewind features. They buffer 20 may also be used for storing the raw video content for future production needs, such as reproducing the video program. The buffer may be implemented with short term memory (RAM), local storage (hard disk on the video production server 10 or otherwise associated with the video source 16), and long term storage (cloud storage, such as AWS S3 or the like). Access to long term storage of the buffers 20 may be seamless, similar to access to short term or local storage.

It should now be appreciated that the present invention provides advantageous methods and apparatus for a cloud-based video production system.

Although the invention has been described in connection with various illustrated embodiments, numerous modifications and adaptations may be made thereto without departing from the spirit and scope of the invention as set forth in the claims.

What is claimed is:

1. A cloud-based video production system, comprising:
a cloud-based video production server;
a remote user interface running on a user device;

one or more video sources in communication with the cloud-based video production server and the remote user interface via a network;
a control unit, located at or in communication with the cloud-based video production server, in communication with the remote user interface via the network; and
a buffer, corresponding to each of the one or more video sources, disposed between each of the one or more video sources and the control unit to account for network delays;
wherein:
each frame of video content is provided with a video timestamp;
commands for selecting and manipulating video content from the one or more video sources are sent from the user interface to the control unit, each of the commands containing a command timestamp corresponding to the video timestamp of the video frame displayed on the user interface when the command is issued;
the control unit executes each command at a time when the video timestamp at an output of the corresponding buffer corresponds to the command timestamp;
the control unit outputs a video program in accordance with the commands; and
the video program comprises at least one of: modified video content from the one or more video sources; or combined video content from more than one of the video sources.

2. A cloud-based video production system in accordance with claim 1, wherein the user interface comprises one of an application or a web browser running on an Internet-enabled device.

3. A cloud-based video production system in accordance with claim 1, wherein the user device comprises one of a computer, a laptop computer, a portable computer, a tablet computer, a smart phone, a smart watch, a personal computing device, and an Internet-enabled device.

4. A cloud-based video production system in accordance with claim 1, wherein the content from the one or more video sources is viewable on the user interface.

5. A cloud-based video production system in accordance with claim 1, wherein the commands comprise commands for selecting from among the video content or portions of the video content provided by the one or more video sources, commands for combining the video content or portions of the video content, commands for switching between the one or more video sources, commands for manipulating the video content or portions of the video content, commands for providing a graphics overlay, commands for turning on or off the graphics overlay, and commands for adjusting an audio level for the video content or the portions of the video content.

6. A cloud-based video production system in accordance with claim 1, wherein each of the one or more video sources comprises one of a video camera, a camcorder, a television camera, a movie camera, a portable electronic device, a tablet computer, a smart phone, and an IP or web camera.

7. A cloud-based video production system in accordance with claim 1, wherein the video program is output for at least one of live broadcast, distribution to one or more social media platforms, and distribution to a digital media distribution platform.

8. A cloud-based video production system in accordance with claim 1, wherein:
the video program is downloaded to the user device;
the downloaded video program is one of distributed to media outlets or social media platforms in an original downloaded form, or modified at the user device prior to such distribution.

9. A cloud-based video production system in accordance with claim 1, wherein the video program comprises one of a news program, a sports program, a weather program, a live event program, and an entertainment program.

10. A cloud-based video production system in accordance with claim 1, wherein the corresponding buffer delays the video content to account for network delay in carrying out the commands.

11. A cloud-based video production system in accordance with claim 1, wherein:
instructions for the commands are sent via an API; and
the instructions are scriptable.

12. A method for cloud-based video production, comprising:
providing a cloud-based video production server;
providing a remote user interface running on a user device;
providing video content from one or more video sources to the cloud-based video production server and the remote user interface via a network;
providing a control unit located at or in communication with the cloud-based video production server which is in communication with the remote user interface via the network; and
buffering the video content via a corresponding buffer for each of the one or more video sources, the corresponding buffer being disposed between each of the one or more video sources and the control unit to account for network delays;
providing each frame of video content with a video timestamp;
sending commands from the user interface to the control unit for selecting and manipulating video content from the one or more video sources, each of the commands containing a command timestamp corresponding to the video timestamp of the video frame displayed on the user interface when the command is issued;
executing each command at the control unit at a time when the video timestamp at an output of the corresponding buffer corresponds to the command timestamp; and
outputting a video program in accordance with the commands;
wherein the video program comprises at least one of: modified video content from the one or more video sources; or combined video content from more than one of the video sources.

13. A method in accordance with claim 12, wherein the user interface comprises one of an application or a web browser running on an Internet-enabled device.

14. A method in accordance with claim 12, wherein the user device comprises one of a computer, a laptop computer, a portable computer, a tablet computer, a smart phone, a smart watch, a personal computing device, and an Internet-enabled device.

15. A method in accordance with claim 12, wherein the content from the one or more video sources is viewable on the user interface.

16. A method in accordance with claim 12, wherein the commands comprise commands for selecting from among the video content or portions of the video content provided by the one or more video sources, commands for combining the video content or portions of the video content, commands for switching between the one or more video sources, commands for manipulating the video content or portions of the video content, commands for providing a graphics overlay, commands for turning on or off the graphics overlay, and commands for adjusting an audio level for the video content or the portions of the video content.

17. A method in accordance with claim 12, wherein each of the one or more video sources comprises one of a video camera, a camcorder, a television camera, a movie camera, a portable electronic device, a tablet computer, a smart phone, and an IP or web camera.

18. A method in accordance with claim 12, wherein the video program is output for at least one of live broadcast, distribution to one or more social media platforms, and distribution to a digital media distribution platform.

19. A method in accordance with claim 12, further comprising:

downloading the video program to the user device; and
one of distributing the downloaded video program to media outlets or social media platforms in an original downloaded form, and modifying the downloaded video program at the user device prior to such distribution.

20. A method in accordance with claim 12, wherein the video program comprises one of a news program, a sports program, a weather program, a live event program, and an entertainment program.

21. A method in accordance with claim 12, wherein the corresponding buffer delays the video content to account for network delay in carrying out the commands.

22. A method in accordance with claim 12, wherein:
instructions for the commands are sent via an API; and
the instructions are scriptable.

* * * * *